United States Patent
Bai et al.

(10) Patent No.: US 11,576,052 B2
(45) Date of Patent: Feb. 7, 2023

(54) PANEL SPECIFIC UPLINK TRANSMISSION

(71) Applicant: QUALCOMM Incorporated, San Diego, CA (US)

(72) Inventors: Tianyang Bai, Bridgewater, NJ (US); Yan Zhou, San Diego, CA (US); Jung Ho Ryu, Fort Lee, NJ (US); Kiran Venugopal, Raritan, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 16/840,214

(22) Filed: Apr. 3, 2020

(65) Prior Publication Data
US 2020/0351673 A1    Nov. 5, 2020

Related U.S. Application Data

(60) Provisional application No. 62/842,762, filed on May 3, 2019.

(51) Int. Cl.
*H04W 16/28* (2009.01)
*H04W 72/04* (2009.01)
(Continued)

(52) U.S. Cl.
CPC .......... *H04W 16/28* (2013.01); *H04L 5/0051* (2013.01); *H04L 25/0226* (2013.01); *H04W 8/24* (2013.01); *H04W 72/046* (2013.01); *H04W 76/11* (2018.02)

(58) Field of Classification Search
CPC .... H04L 25/0226; H04L 5/0051; H04W 8/24; H04W 72/046; H04W 76/11; H04W 16/28
See application file for complete search history.

(56) References Cited

U.S. PATENT DOCUMENTS

2019/0103908 A1* 4/2019 Yu ................ H04B 7/0695
2019/0132851 A1* 5/2019 Davydov ............ H04B 7/08
(Continued)

FOREIGN PATENT DOCUMENTS

CN        113259076 A  *  8/2021
WO   WO-2018085601 A1  *  5/2018  .......... H04B 7/0695
(Continued)

OTHER PUBLICATIONS

Apple Inc: "Consideration on Beam Measurement and Reporting Enhancement", 3GPP Draft, 3GPP TSG RAN WG1 #96, R1-1902768, Consideration on Beam Measurement and Reporting Enhancement, 3rd Generation Partnership Project (3GPP), , vol. RAN WG1, No. Athens, Greece, Feb. 25, 2019-Mar. 1, 2019, Feb. 16, 2019 (Feb. 16, 2019), XP051600463, 9 Pages, Retrieved from the Internet: URL: http://www.3gpp.org/ftp/tsg%5Fran/WG1%5FRL1/TSGR1%5F96/Docs/R1%2D1902768%2Ezip. [retrieved on Feb. 16, 2019] para. 6, 6 Beam sweep over slot aggregation.
(Continued)

*Primary Examiner* — Deepa Belur
(74) *Attorney, Agent, or Firm* — Procopio, Cory, Hargreaves & Savitch LLP

(57) ABSTRACT

To schedule panel specific uplink transmissions, the UE may assist in the scheduling of the panel specific uplink transmission by improving the manner in which the specific panel is indicated for uplink transmission. The apparatus receives, from a base station, an indication of a UE panel for an uplink transmission. The apparatus determines a Tx panel at the UE based on the indication of the UE panel. The apparatus transmits, to the base station, the uplink transmission using the Tx beam associated with the Tx panel.

30 Claims, 12 Drawing Sheets

(51) Int. Cl.
*H04W 8/24* (2009.01)
*H04L 25/02* (2006.01)
*H04L 5/00* (2006.01)
*H04W 76/11* (2018.01)

(56) References Cited

U.S. PATENT DOCUMENTS

| | | | |
|---|---|---|---|
| 2020/0008216 A1* | 1/2020 | Iyer | H04W 72/042 |
| 2020/0288479 A1* | 9/2020 | Xi | H04B 7/02 |
| 2020/0373988 A1* | 11/2020 | Wang | H04W 16/28 |
| 2021/0288711 A1* | 9/2021 | Cao | H04B 7/0404 |

FOREIGN PATENT DOCUMENTS

| | | | | |
|---|---|---|---|---|
| WO | WO-2019099659 A1 * | 5/2019 | | H04B 7/02 |
| WO | WO-2020088225 A1 * | 5/2020 | | H04L 5/0048 |
| WO | WO-2020191588 A1 * | 10/2020 | | H04B 17/30 |

OTHER PUBLICATIONS

CMCC: "Enhancements on Multi-Beam Operation", 3GPP Draft, 3GPP TSG RAN WG1 #97, R1-1906522, 3rd Generation Partnership Project (3GPP), Mobile Competence Centre 650, Route Des Lucioles, F-06921 Sophia-Antipolis Cedex, France, vol. Ran WG1, No. Reno, USA, May 13, 2019-May 17, 2019 May 2, 2019 (May 2, 2019), XP051708557, 7 Pages, Retrieved from the Internet: URL:http://www.3gpp.org/ftp/tsg%5Fran/WG1%5FRL1/TSGR1%5F97/Docs/R1%2D1906522%2Ezip [retrieved on May 2, 2019] p. 2, third paragraph.

International Search Report and Written Opinion—PCT/US2020/026924—ISA/EPO—Jun. 16, 2020.

LG Electronics: "Updated Feature Lead Summary of Enhancements on Multi-beam Operations", 3GPP Draft, 3GPP TSG RANn WG1 Meeting #96bis, R1-1905784 R1#96BIS Updated FL Summary Multibeam(MB1), 3rd Generation Partnership Project (3GPP), vol. RAN WG1, No. Xi 'an, China, Apr. 8, 2019-Apr. 12, 2019 Apr. 15, 2019 (Apr. 15, 2019), XP051707832, 24 Pages, Retrieved from the Internet: URL:http://www.3gpp.org/ftp/tsg%5Fran/WG1%5FRL1/TSGR1%5F96b/Docs/R1%2D1905784%2Ezip [retrieved on Apr. 15, 2019] p. 18.

VIVO: "Discussion on Multi-Beam Operation", 3GPP Draft, 3GPP TSG RAN WG1 Ad-Hoc Meeting 1901, R1-1900138 Discussion on Multi-Beam Operation, 3rd Generation Partnership Project (3GPP), vol. RAN WG1, No. Taipei, Jan. 21, 2019-Jan. 25, 2019 Jan. 20, 2019 (Jan. 20, 2019), XP051593064, 10 Pages, Retrieved from the Internet: URL http://www.3gpp.org/ftp/Meetings%5F3GPP%5FSYNC/RAN1/Docs/R1%2D1900138%2Ezip [retrieved on Jan. 20, 2019] p. 4, 3, UL multi-panel/multi-beam transmission.

\* cited by examiner

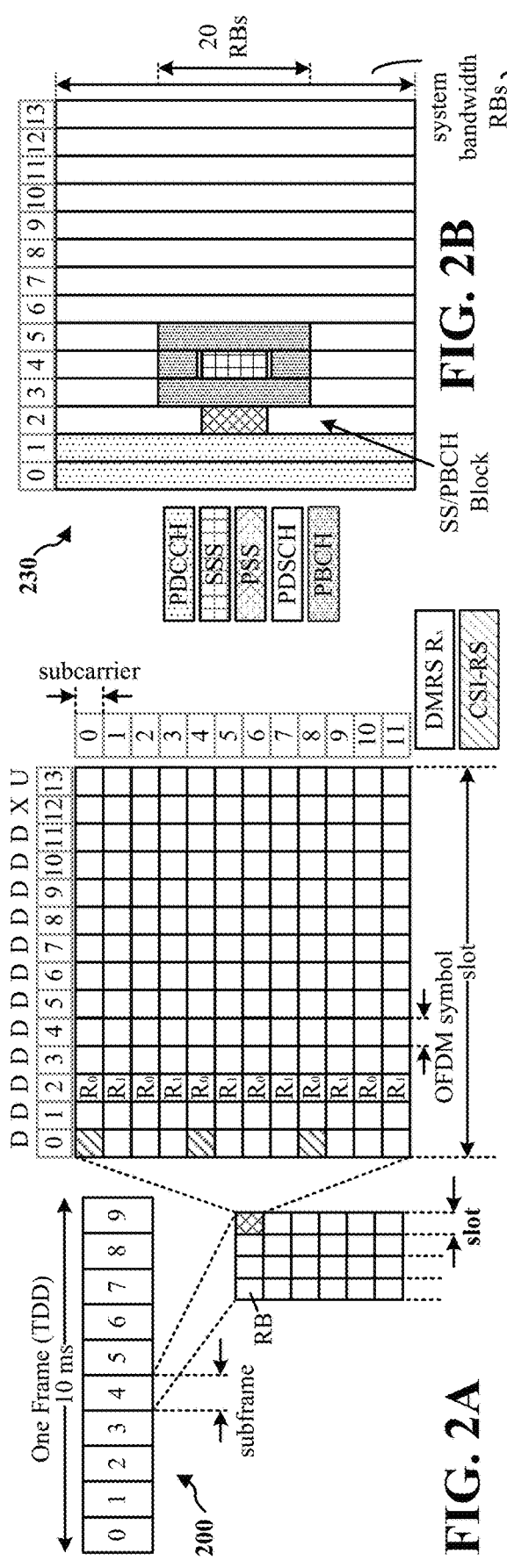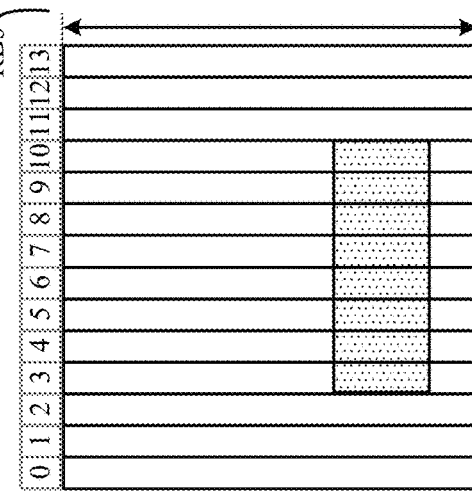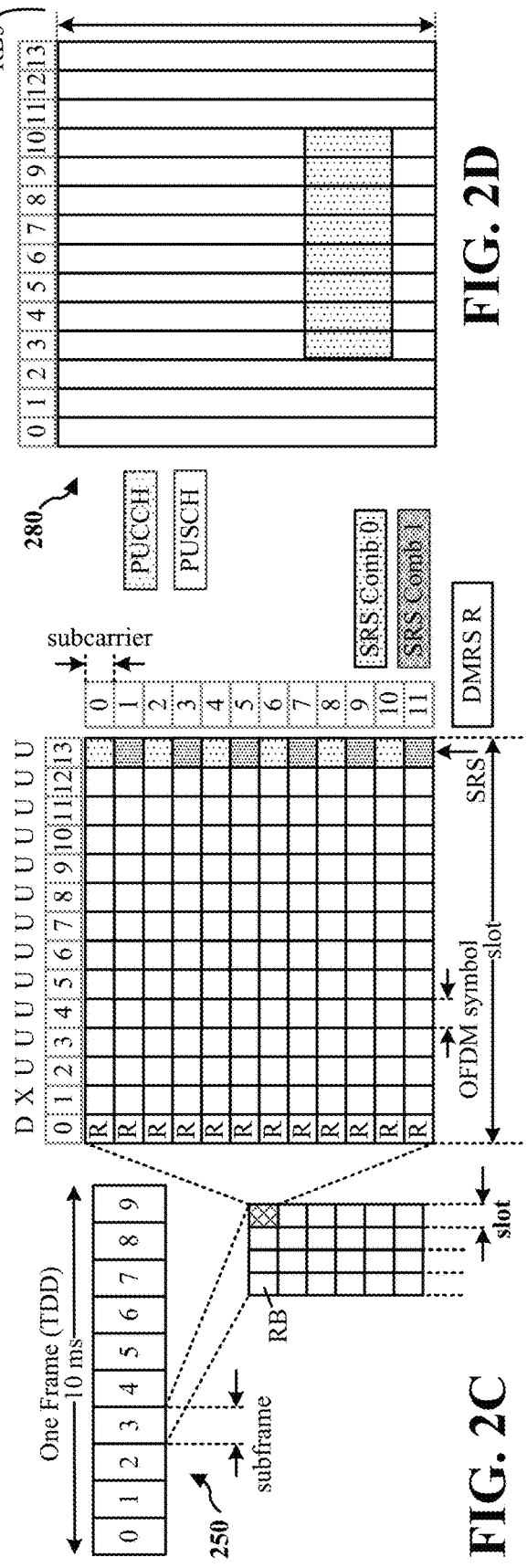
FIG. 2A
FIG. 2B
FIG. 2C
FIG. 2D

PANEL SPECIFIC UPLINK TRANSMISSION

CROSS REFERENCE TO RELATED APPLICATION(S)

This application claims the benefit of U.S. Provisional Application Ser. No. 62/842,762, entitled "Panel Specific Uplink Transmission" and filed on May 3, 2019, which is expressly incorporated by reference herein in its entirety.

BACKGROUND

Technical Field

The present disclosure relates generally to communication systems, and more particularly, to panel specific uplink transmissions.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a UE. The apparatus receives, from a base station, an indication of a UE panel for an uplink transmission. The apparatus determines a transmit (Tx) panel at the UE based on the indication of the UE panel. The apparatus transmits, to the base station, the uplink transmission using a Tx beam associated with the Tx panel.

In another aspect of the disclosure, a method, a computer-readable medium, and an apparatus are provided for wireless communication at a base station. The apparatus determines a panel, for an uplink transmission. The apparatus sends, to a UE, an indication of the panel for the uplink transmission. The apparatus receives, from the UE, the uplink transmission from a transmit (Tx) beam associated with the panel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
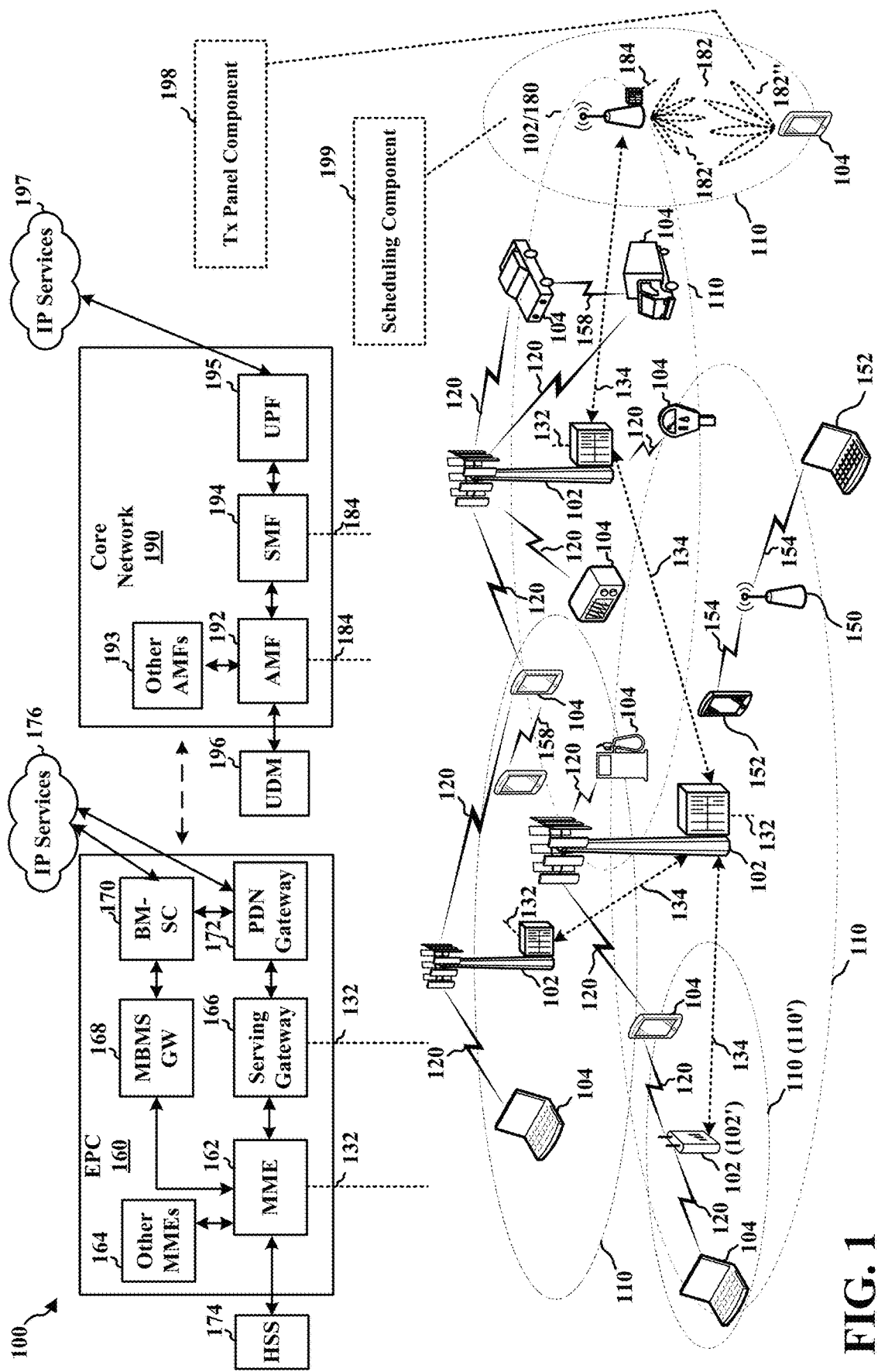
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to assist the network in scheduling panel specific uplink transmissions by improving the manner in which the specific panel is indicated for uplink transmission. For example, the UE 104 of FIG. 1 includes a Tx panel component 198 configured to determine a transmit (Tx) panel at the UE based on an indication of a UE panel received from a base station. The indication of the UE panel may be indicated by a panel identifier (ID), wherein the panel ID refers to the UE panel the UE may utilize for the uplink transmission.

Referring again to FIG. 1, in certain aspects, the base station 102/180 may be configured to schedule panel specific uplink transmissions. For example, the base station 102/180 of FIG. 1 includes a scheduling component 199 configured to determine a panel of a UE for an uplink transmission and to provide signaling to the UE, in order for the UE to carry out the panel specific uplink transmission.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The sub-carrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIGs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
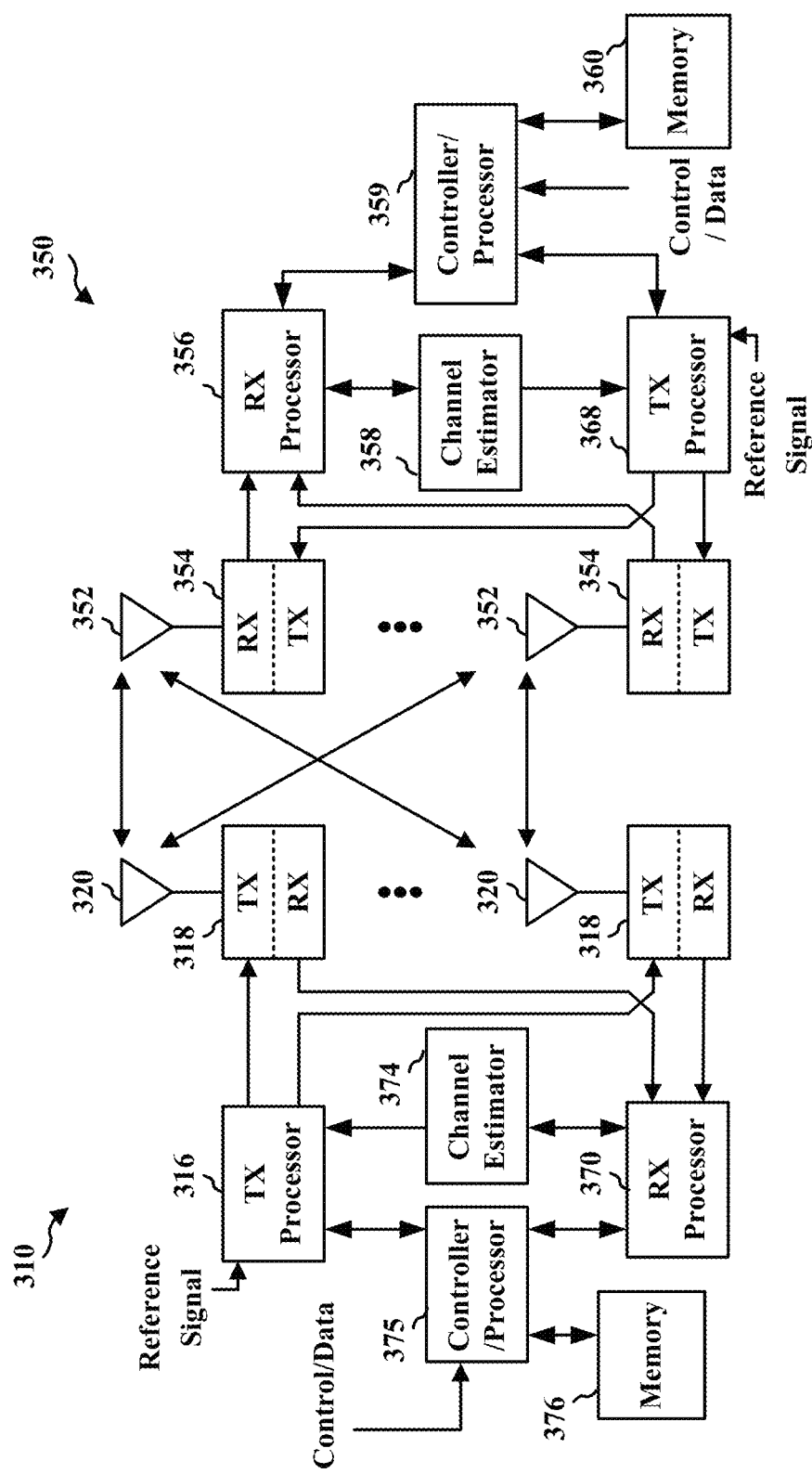
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
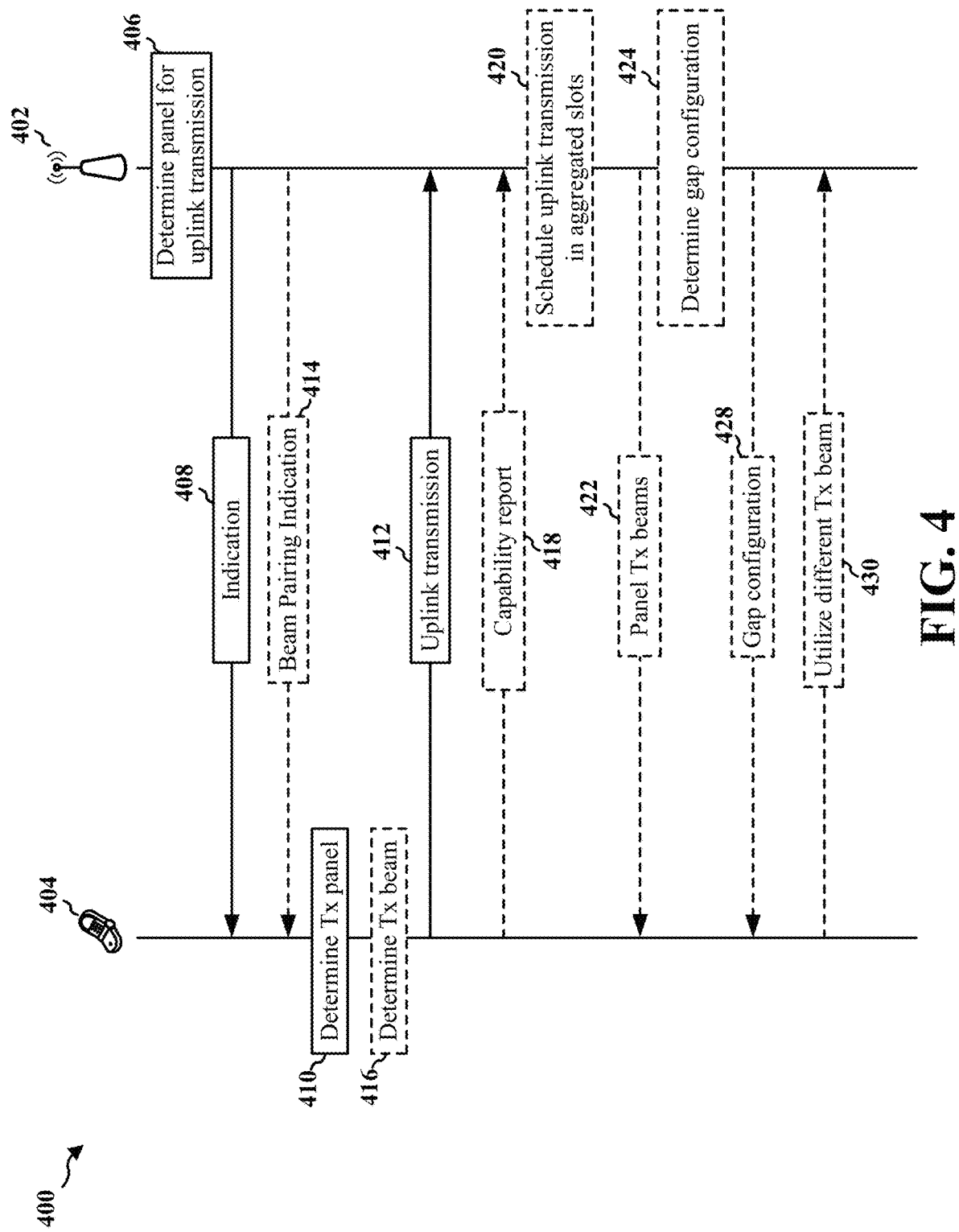
FIG. 4 is a call flow diagram of signaling between a UE and a base station in accordance with certain aspects of the disclosure.

FIG. 4 is a call flow diagram of signaling between a UE and a base station in accordance with certain aspects of the disclosure. The diagram 400 of FIG. 4 includes a base station 402 and a UE 404. The base station 402 may be configured to provide a cell. For example, in the context of FIG. 1, the base station 402 may correspond to base station 102/180 and, accordingly, the cell may include a geographic coverage area 110 in which communication coverage is provided and/or small cell 102' having a coverage area 110'. Further, a UE 404 may correspond to at least UE 104. In another example, in the context of FIG. 3, the base station 402 may correspond to the base station 310 and the UE 404 may correspond to UE 350. Optional aspects are illustrated with a dashed line.

To schedule panel specific uplink transmission, the base station 402 may be configured to determine a panel for an uplink transmission. The base station 402 may send, to the UE 404, an indication 408 of the panel for the uplink transmission. The UE 404 receives, from the base station 402, the indication 408 of the panel for the uplink transmission. In some aspects, the panel for the uplink transmission may be indicated by a panel identifier (ID). The panel ID refers to the panel of the UE to be used for the uplink transmission. In some aspects, the UE may use the panel indicated by the panel ID for the uplink transmission. In some aspects, the panel scheduled for the uplink transmission may be indicated based on a reference signal (RS) resource set. The RS resource set may be associated with the panel of the UE. In some aspects, the RS resource set may be at least one of a downlink (DL) RS or an uplink (UL) RS, where the resources in the DL RS or the UL RS are associated with at least one panel of the UE. In some aspects, the panel scheduled for the uplink transmission may be indicated based on a previously scheduled panel for uplink transmission.

In some aspects, the base station 402 may send an indication 414 of a beam pairing to the UE 404. The UE 404 may receive, from the base station 402, the indication 414 of the beam pairing. The UE 404 may determine a transmit (Tx) panel 410 at the UE for the uplink transmission based on the indication 408 of the UE panel from the base station. In some aspects, the UE may utilize the indication 408 and the beam pairing indication 414 in order to determine the Tx beam 416. The Tx beam 416 may be the beam that the UE may use for the uplink transmission. In some aspects, the base station may indicate the Tx beam associated with the panel of the UE, based on the indication 408 of the UE panel and the indication 414 of the beam pairing. For example, in some aspects, the beam pairing indication 414 may indicate a receive (Rx) beam of the base station 402 and the panel of the UE 404 for the uplink transmission, such that the UE may determine a suitable Tx beam 416 of the panel that corresponds with the Rx beam of the base station. In some aspects, at least one of the Tx beam of the UE or the Rx beam of the base station may be indicated in a resource ID. The resource ID may be associated with at least one of a sounding reference signal resource indicator (SRI) for a sounding reference signal (SRS), a synchronizing signal block indicator (SSBI), a channel state information reference signal resource indicator (CSIRI), or an indication of a base station beam, or an indication of a UE beam. Upon the determination of at least the Tx panel 410, the UE may transmit, to the base station, the uplink transmission 412 using a Tx beam 416 associated with the Tx panel 410. The base station may receive the uplink transmission from a Tx beam associated with the panel, that was scheduled for the uplink transmission. The uplink transmission 412 may comprise at least one of physical uplink control channel (PUCCH), physical uplink shared channel (PUSCH), or a sounding reference signal (SRS).

In some aspects, the uplink transmission may be configured to be transmitted in a plurality of aggregated slots or mini-slots. In some aspects, the base station 402 may be configured to schedule the uplink transmission to be transmitted in the plurality of aggregated slots or mini-slots using different beams, at 420. The base station may determine the beams for the aggregated slots based on the capability of the UE. For example, the UE may be configured to send, to the base station, a capability report 418. The capability report 418 may include various capabilities of the UE, such as but not limited to, a time duration for switching between different panels or beams from the same panel.

The base station may receive the capability report 418 and may take into account the information within the capability report when scheduling, at 420, the uplink transmission to be transmitted in a plurality of aggregated slots or a plurality of mini-slots using different beams. The transmission may be transmitted using different beams, at 430, for example. The base station may determine the beams for the aggregated slots based on the capability report 418 received from the UE. In addition, the base station may utilize the capability report 418 to determine the panel Tx beams 422. In some aspects, the base station may indicate, to the UE, different Tx beams 422 from a same panel for the uplink transmission in the plurality of aggregated slots or mini-slots when the time to switch between different panels is greater than a threshold. In some aspects, the base station may indicate, to the UE, different Tx beams 422 from different panels for the uplink transmission in the plurality of aggregated slots or mini-slots when the time to switch is less than a threshold. Using different Tx beams for the plurality of aggregated slots or mini-slots provides the advantage of increasing diversity. Using different beams across one or more panels may involve a transition time to adjust to the different beams. As such, when scheduling panel specific aggregated slots, the base station may be configured to determine the beams for the aggregated slots based on the capability of the UE. The capability report of the UE may include the transition time between different beams within one panel or across the panel, such as for example, the transition time of the beam within a first panel and within a second panel, the transition time when transmitting from the first panel to the second panel.

Figure 5:
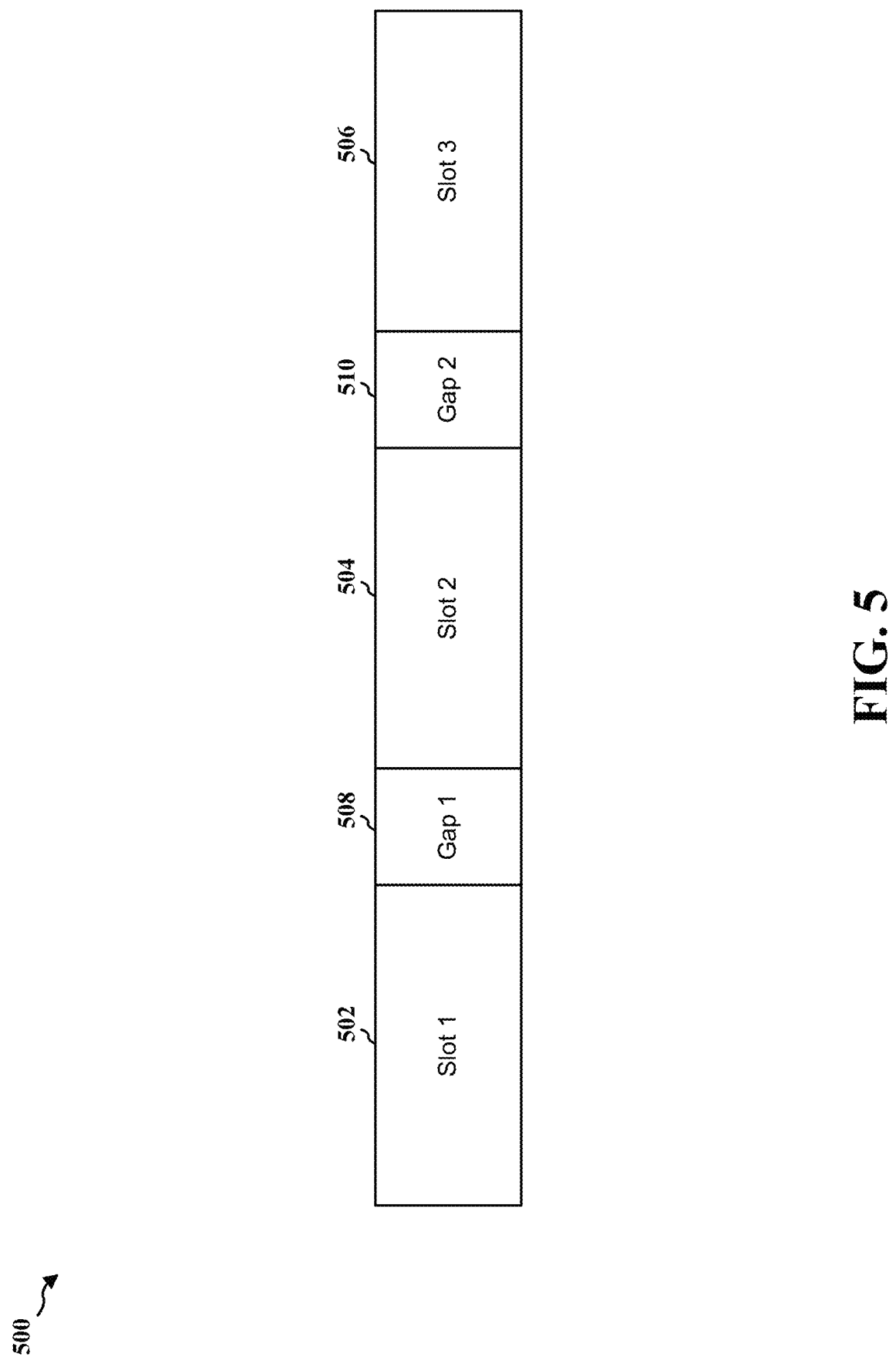
FIG. 5 is a diagram illustrating an example of an aggregated slot in accordance with certain aspects of the disclosure.

In some aspects, the UE may make determinations with regards to the beams used for aggregation. For example, all the beams used for aggregation could be from the same panel, or from a group of panels which the transition time in between them is lower than a threshold. In another example, if the transition time is negligible when transmitting between panels, the base station may schedule a gap time period between the transition of the slots to accommodate the transition time. The configuration of the gap may be indicated to the UE when scheduling the aggregation. The base station may determine the gap configuration 424 between the plurality of aggregated slots or mini-slots based on the capability report, e.g., as shown in FIG. 5. The base station may indicate the gap configuration 428 to the UE, such that the UE receives the gap configuration from the base station. In some aspects, the UE may reserve a gap slot (e.g., 508, 510) between each of the plurality of consecutive slots. The gap slot may be reserved based on the reported time for switching between different panels or beams from the same panel or a predefined rule. In the example 500 of FIG. 5, the gap configuration 428 comprises a first gap 508 and a second gap 510. However, the disclosure is not intended to be limited to the aspects disclosed herein. The gap configuration may be configured in many different configurations.

Figures 6A, 6B:
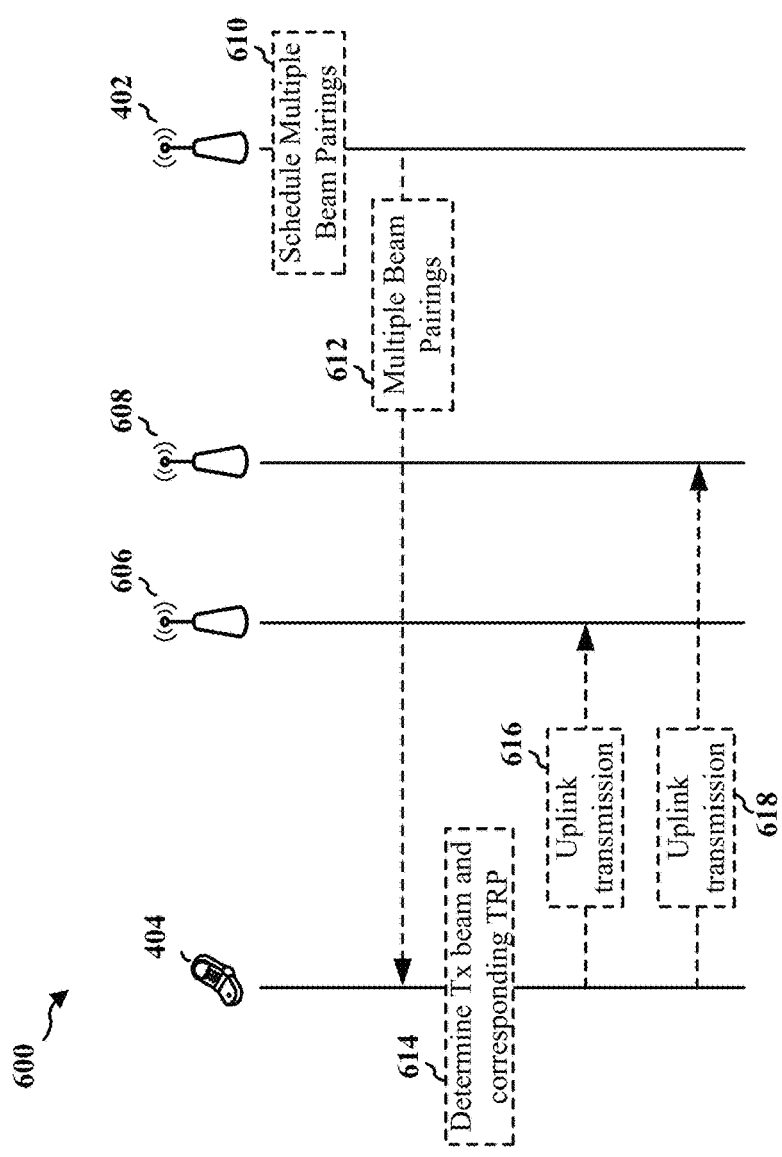
FIG. 6A is a call flow diagram of a UE in a multi-transmit reception point (TRP) configuration in accordance with certain aspects of the disclosure.
FIG. 6B is a diagram illustrating an example of a UE in a multi-TRP configuration in accordance with certain aspects of the disclosure.

In some aspects, as shown in FIGS. 6A-6B, the base station 402 may be associated with a plurality of TRPs. FIG. 6A is a first diagram 600 of a UE communicating with multiple TRPs. FIG. 6B is a second diagram 650 of a UE communicating with multiple TRPs. A TRP may be a transmission/reception node that is controlled by an entity (e.g., base station 402), and configured to wirelessly communicate with another device (e.g., UE 404). In order for the UE to receive data from a TRP, the base station may inform the UE of the Transmission Configuration Indication (TCI) state. The TCI state may include beam information of the TRP (e.g., 620, 622, 624, 626, 628, 630). The UE, using the TRP beam information, may determine a corresponding beam to communicate with the TRP. In the example of FIG. 6B, the UE 404 is configured to communicate with TRP A 606 along the beam pair of Tx Beam #0 632 for the UE and Rx Beam #2 624 for the TRP A. The UE 404 is further configured to communicate with TRP B 608 along the beam pair of Tx Beam #2 636 for the UE and Rx Beam #3 626 for the TRP B. However, the disclosure is not intended to be limited to the example of FIG. 6B. The UE and/or TRPs may use different beams to communicate beyond the beams shown in FIG. 6B. For example, the UE 404 may communicate with either the TRP A 606 or TRP B 608 using Tx Beam #1 634.

In the example of FIG. 6A, the base station 402 is associated with a first TRP 606 and a second TRP 608. In such aspects, the base station may schedule 610 multiple beam pairings for the plurality of TRPs (e.g., 606, 608). The base station may send, to the UE, an indication 612 of the multiple beam pairings, such that the UE is configured to transmit to the plurality of TRPs (e.g., 606, 608). In some aspects, the indication 612 of multiple beam pairings may indicate that different panels of the UE are associated with different TRPs from among the plurality of TRPs. In some aspects, the indication 612 of the multiple beam pairings may indicate that Tx beams from one panel of the UE are paired with one TRP from among the plurality of TRPs.

The UE 404 receives the indication 612 of the multiple beam pairings. The UE may be configured to transmit to a plurality of TRPs associated with the base station. The UE, at 614, may determine the Tx beam and a corresponding TRP of the plurality of TRPs (e.g., 606, 608) based on the indication 612. In some aspects, the UE may determine that different panels of the UE are associated with different TRPs from among the plurality of TRPs based on the indication 612 of multiple beam pairings received from the base station. In some aspects, the UE may determine that Tx beams from one panel of the UE are paired with one TRP from among the plurality of TRPs based on the indication 612 of multiple beam pairings received from the base station. The UE may then transmit, to the corresponding TRP (e.g., 606, 608), the uplink transmission (e.g., 616, 618) using the Tx beam associated with the corresponding panel of the UE.

Figure 7:
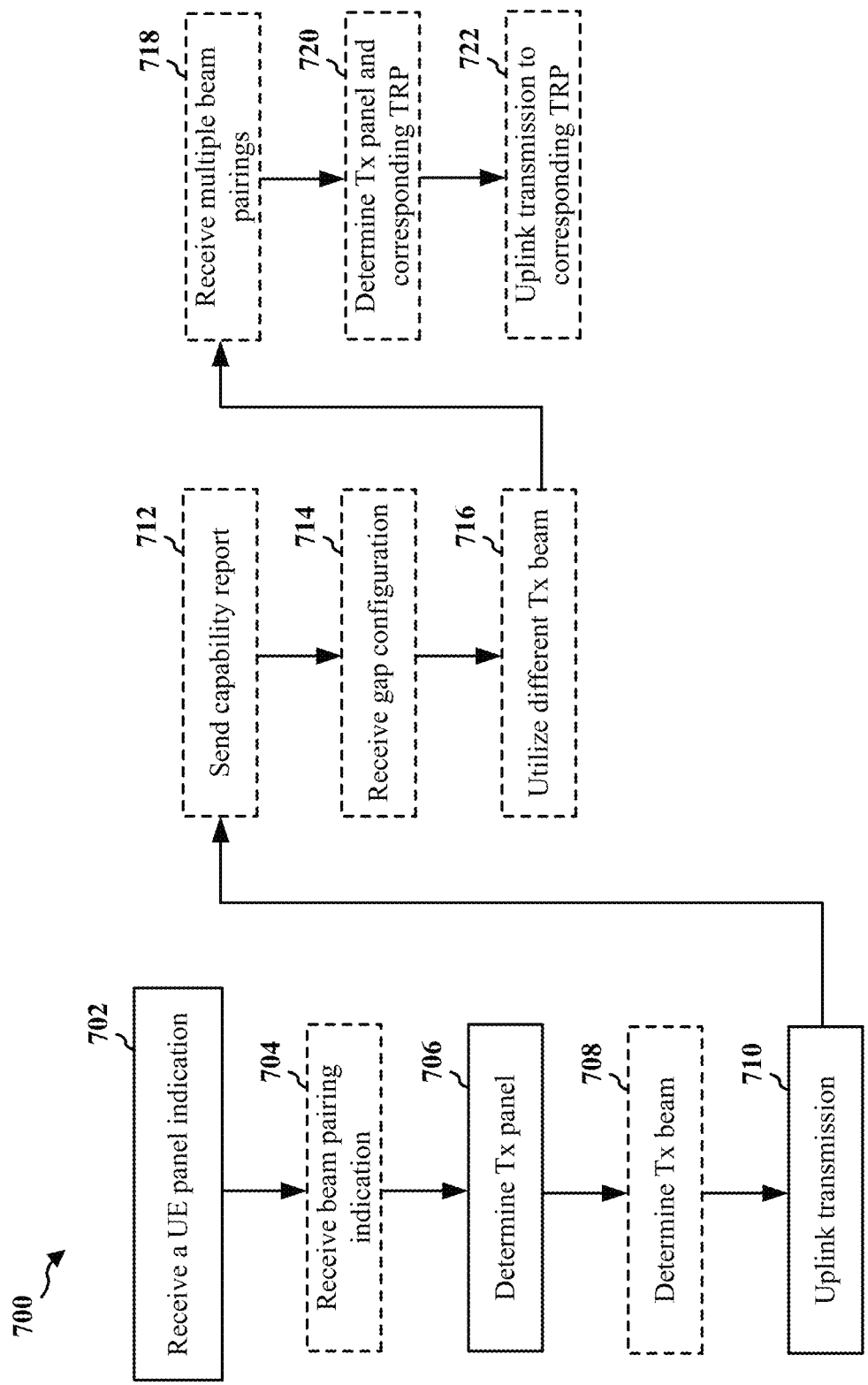
FIG. 7 is a flowchart of a method of wireless communication.

FIG. 7 is a flowchart 700 of a method of wireless communication. The method may be performed by a UE (e.g., the UE 104, 350, 404, 1150; the apparatus 802/802'; the processing system 914, which may include the memory 360 and which may be the entire UE or a component of the UE, such as the TX processor 368, the RX processor 356, and/or the controller/processor 359). One or more of the illustrated operations may be omitted, transposed, or contemporaneous. In FIG. 7, optional aspects are illustrated with a dashed line. The method may enable a UE to determine a panel for use in uplink transmissions based on information received from a base station.

At 702, the UE may receive, from a base station (e.g., 402), an indication (e.g., 408) of a UE panel for an uplink transmission. For example 702 may be performed by UE panel component 806 of apparatus 802. FIG. 4 illustrates an example in which an indication of a UE panel for uplink transmission 408 is received from base station 402.

In some aspects, for example, at 704, the UE may receive a beam pairing indication (e.g., 414) of a beam pairing. For example 704 may be performed by beam pairing component 808 of apparatus 802. FIG. 4 illustrates an example in which a beam pairing indication 414 is received from a base station 402.

At 706, the UE may determine a Tx panel at the UE based on the indication (e.g., 408) of the UE panel. For example 706 may be performed by Tx panel component 810 of apparatus 802. In some aspects, the UE panel may be indicated based on a panel previously scheduled for uplink transmission.

In some aspects, for example, at 708, the UE may determine the Tx beam (e.g., 416) based on the indication (e.g., 408) of the UE panel and the beam pairing indication (e.g., 414). For example 708 may be performed by Tx beam component 812 of apparatus 802. In some aspects, the beam pairing may indicate a Rx beam of the base station. The UE may determine a corresponding Tx beam of the UE panel based on the Rx beam. In some aspects, at least one of the Tx beam of the UE or the Rx beam of the base station may be indicated in a resource ID associated with at least one of an sounding reference signal resource indicator (SRI) for a SRS, a synchronizing signal block indicator (SSBI), a channel state information reference signal resource indicator (CSIRI), or a base station beam indication, or a UE beam indication.

At 710, the UE may transmit, to the base station, the uplink transmission (e.g., 412) using a Tx beam associated with the Tx panel. For example 710 may be performed by transmission component 826 of apparatus 802. In some aspects, the UE panel may be indicated by a panel ID. The panel ID may refer to the UE panel the UE may utilize for the uplink transmission. In some aspects, the UE panel may be indicated based on a RS resource set, wherein the RS resource set is associated with the UE panel. The RS resource set may comprise at least one of a DL RS or an UL RS. The resources in the DL RS or the UL RS may be associated with a panel. In some aspects, the uplink transmission may comprise at least one of a PUCCH, a PUSCH, or a sounding reference signal (SRS).

In some aspects, for example, at 712, the UE may send, to the base station, a capability report (e.g., 418) including a time for switching between different panels or beams from the same panel. For example 712 may be performed by capability component 814 of apparatus 802. The capability report may help the base station to determine whether to indicate for the UE to switch beams within a same panel or between different panels in slots. In some aspects, a gap slot may be reserved between each of a plurality of consecutive slots. The gap slot may be reserved based on the reported time for switching between different panels or beams from the same panel or a predefined rule.

In some aspects, for example, at 714, the UE may receive a gap configuration (e.g., 428) from the base station. For example 714 may be performed by gap component 816 of apparatus 802. FIG. 5 illustrates an example of gaps 508, 510 between transmissions in slots.

In some aspects, the uplink transmission may be transmitted in a plurality of aggregated slots or mini-slots (e.g., 502, 504, 506). In such aspects, for example, at 716, the UE may utilize a different Tx beam to transmit the uplink transmission in each of the plurality of aggregated slots or mini-slots. For example, the use of different Tx beams, at 716, may be performed by different Tx beam component 818 of apparatus 802. For example, the UE may use different Tx beams to transmit in Slot 1 502, Slot 2 504, and Slot 3 506 in the example in FIG. 5. In some aspects, the different Tx beams used to transmit the uplink transmission in the plurality of aggregated slots or mini-slots may be from a same panel when a switching time is greater than a threshold. In some aspects, the different Tx beams used to transmit the uplink transmission in the plurality of aggregated slots or mini-slots may be from different panels when a switching time is less than a threshold.

In some aspects, for example, at 718, the UE may receive, from the base station, a multiple beam indication (e.g., 612) of multiple beam pairings. For example 718 may be performed by multiple beams component 820 of apparatus 802. The UE may be configured to transmit to a plurality of TRPs (e.g., 606, 608) associated with the base station. Aspects of indication(s) that can be received for communication with multiple TRPs is described in connection with FIG. 6A. In some aspects, the multiple beam indication of the multiple beam pairings may indicate that different panels of the UE may be associated with different TRPs from among the plurality of TRPs. In some aspects, the indication of multiple beam pairings may indicate that Tx beams from one panel of the UE may be paired with one TRP from among the plurality of TRPs.

In some aspects, for example, at 720, the UE may determine the Tx beam and a corresponding TRP (e.g., 614) of the plurality of TRPs based on the indication (e.g., 612). For example 720 may be performed by Tx and TRP component 822 of apparatus 802. Aspects of such a determination are described in connection with FIGS. 6A and 6B.

In some aspects, for example, at 722, the UE may transmit, to the corresponding TRP (e.g., 606, 608), the uplink transmission (e.g., 616, 618) using the Tx beam associated with the corresponding panel of the UE. For example 722 may be performed by TRP component 824 of apparatus 802. FIG. 6B illustrates an example of a UE transmitting to multiple TRPs.

Figure 8:
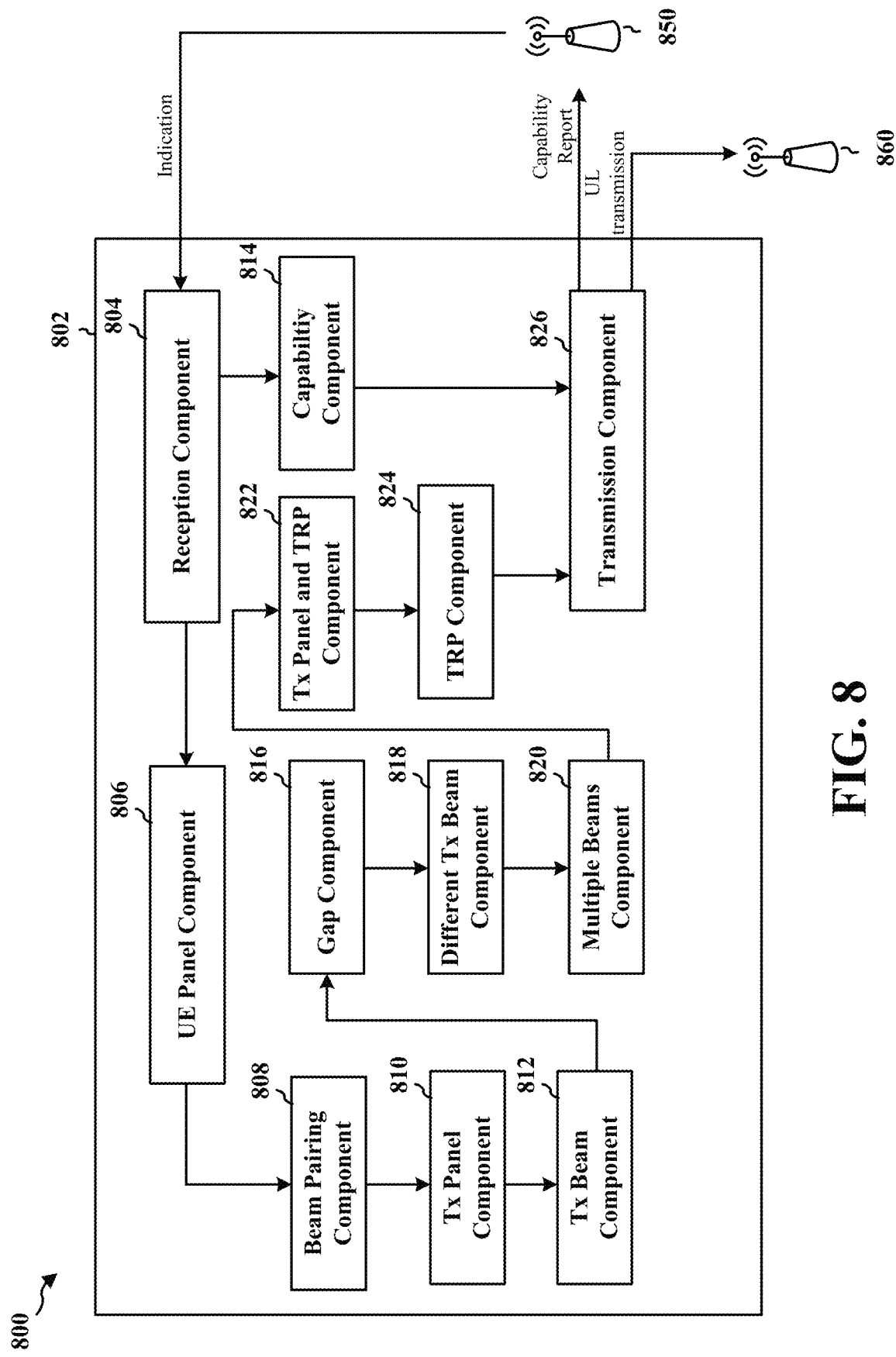
FIG. 8 is a conceptual data flow diagram illustrating the data flow between different means/components in an example apparatus.

FIG. 8 is a conceptual data flow diagram 800 illustrating the data flow between different means/components in an example apparatus 802. The apparatus may be a UE. The apparatus includes a reception component 804 that may receive downlink communications from a base station (e.g., 850). The apparatus includes a UE panel component 806 that may receive, from a base station, an indication (e.g., 408) of a UE panel for an uplink transmission, e.g., as described in connection with 702 from FIG. 7. The apparatus includes a beam pairing component 808 that may receive an indication (e.g., 414) of a beam pairing, e.g., as described in connection with 704 of FIG. 7. The apparatus includes a Tx panel component 810 that may determine a Tx panel at the UE based on the indication (e.g., 408) of the UE panel, e.g., as described in connection with 706 of FIG. 7. The apparatus includes a Tx beam component 812 that may determine the Tx beam based on the indication (e.g., 408) of the UE panel and the indication (e.g., 414) of the beam pairing, e.g., as described in connection with 708 of FIG. 7. The apparatus includes a capability component 814 that may send, to the base station, a capability report (e.g., 418) including a time for switching between different panels or beams from the same panel, e.g., as described in connection with 712 of FIG. 7. The apparatus includes a gap component 816 that may receive a gap configuration (e.g., 428) from the base station, e.g., as described in connection with 714 of FIG. 7. The apparatus includes a different Tx beam component 818 that may utilize a different Tx beam to transmit the uplink transmission in each of a plurality of aggregated slots or mini-slots (e.g., 502, 504, 506), when the uplink transmission is configured to transmit in a plurality of aggregated slots or mini-slots, e.g., as described in connection with 716 of FIG. 7. The apparatus includes a multiple beams component 820 that may receive, from the base station, an indication (e.g., 612) of multiple beam pairings, e.g., as described in connection with 718 of FIG. 7. The UE may be configured to transmit to a plurality of TRPs (e.g., 606, 608) associated with the base station. The apparatus includes a Tx panel and TRP component 822 that may determine the Tx beam and a corresponding TRP (e.g., 614) of the plurality of TRPs based on the indication (e.g., 612), e.g., as described in connection with 720 of FIG. 7. The apparatus includes a TRP component 824 that may transmit, to the corresponding TRP (e.g., 606, 608), the uplink transmission (e.g., 616, 618) using the Tx beam associated with the corresponding panel of the UE, e.g., as described in connection with 722 of FIG. 7. The apparatus includes a transmission component 826 that may transmit uplink communications to at least one base station (e.g., 850, 860).

The apparatus may include additional components that perform each of the blocks of the algorithm in the aforementioned flowcharts of FIG. 7. As such, each block in the aforementioned flowcharts of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
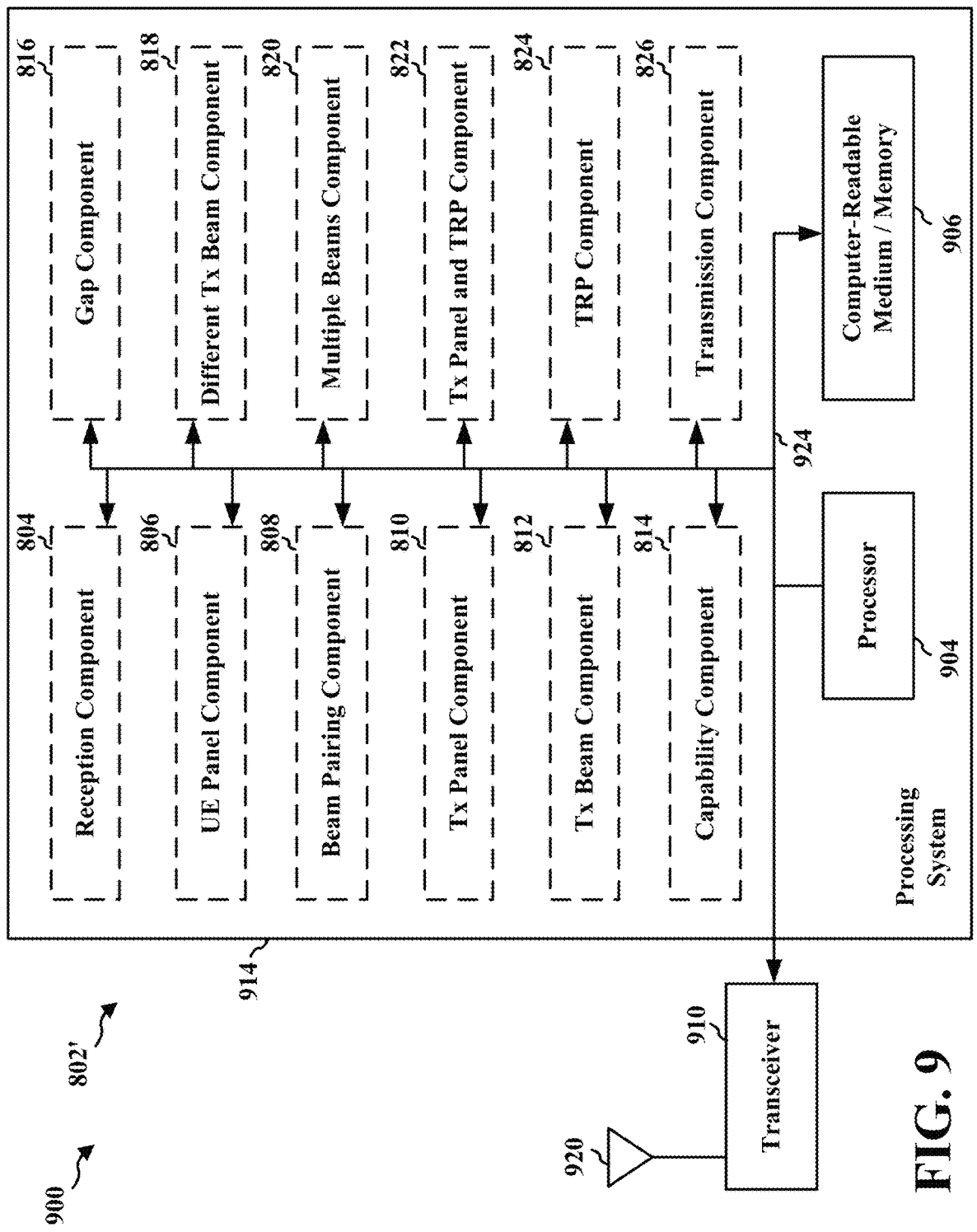
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812, 814, 816, 818, 820, 822, 824, 826 and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 826, and based on the received information, generates a signal to be applied to the one or more antennas 920. The processing system 914 includes a processor 904 coupled to a computer-readable medium/ memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812, 814, 816, 818, 820, 822, 824, 826. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359. Alternatively, the processing system 914 may be the entire UE (e.g., see 350 of FIG. 3).

In one configuration, the apparatus 802/802' for wireless communication includes means for receiving, from a base station, an indication of a UE panel for an uplink transmission. The apparatus includes means for determining a Tx panel at the UE based on the indication of the UE panel. The apparatus includes means for transmitting, to the base station, the uplink transmission using a Tx beam associated with the Tx panel. The apparatus may further include means for receiving an indication of a beam pairing. The apparatus may further include means for determining the Tx beam based on the indication of the UE panel and the indication of the beam pairing. The apparatus may further include means for utilizing a different Tx beam to transmit the uplink transmission in each of the plurality of aggregated slots or mini-slots. The apparatus may further include means for sending, to the base station, a capability report including a time for switching between different panels or beams from the same panel. The apparatus may further include means for receiving a gap configuration from the base station. The apparatus may further include means for receiving, from the base station, an indication of multiple beam pairings. The UE may be configured to transmit to a plurality of TRPs associated with the base station. The apparatus may further include means for determining the Tx beam and a corresponding TRP of the plurality of TRPs based on the indication. The apparatus may further include means for transmitting, to the corresponding TRP, the uplink transmission using the Tx beam associated with the corresponding panel of the UE. The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/ processor 359 configured to perform the functions recited by the aforementioned means.

Figure 10:
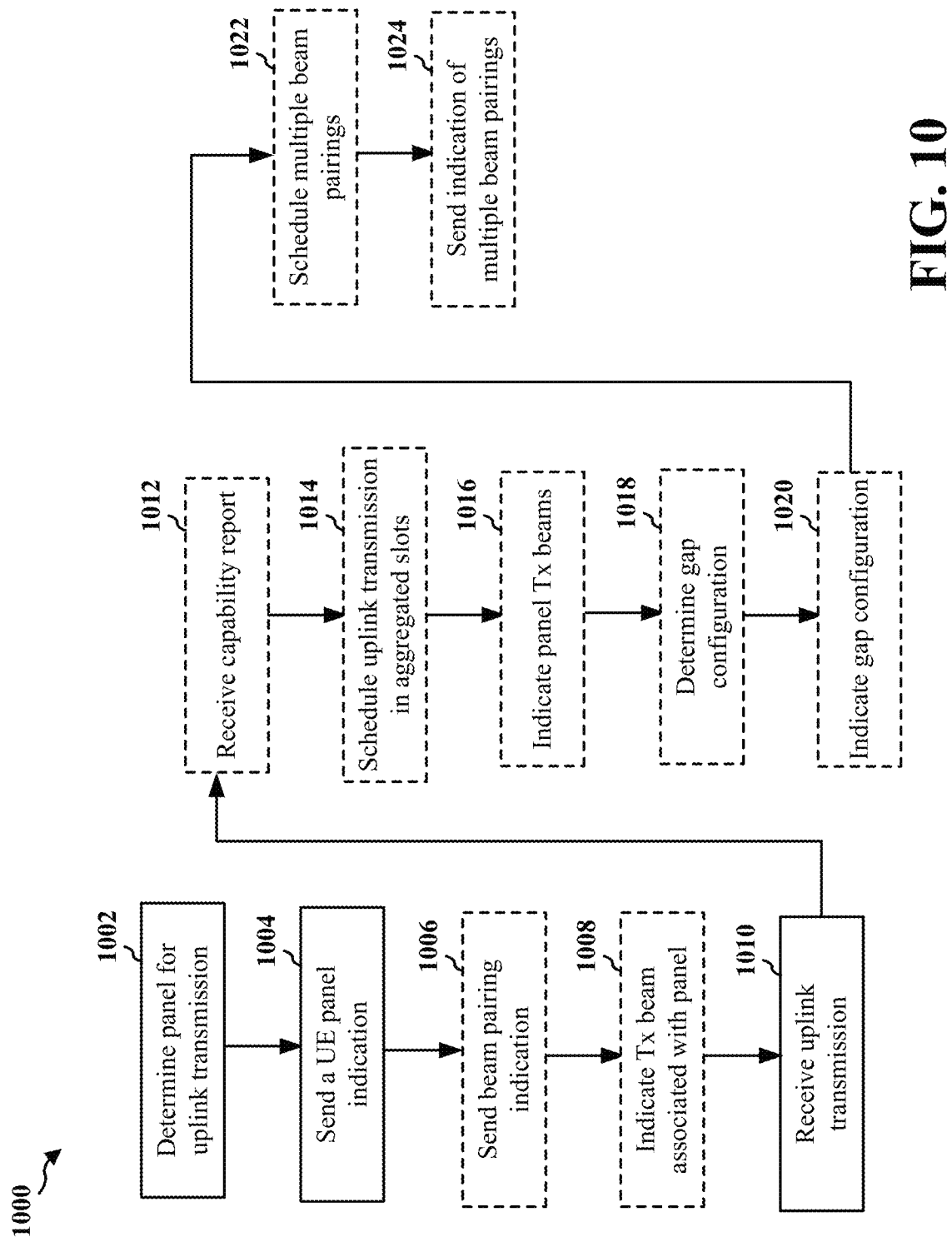
FIG. 10 is a flowchart of a method of wireless communication.

FIG. 10 is a flowchart 1000 of a method of wireless communication. The method may be performed by a base station (e.g., the base station 102, 180, 310, 402, 606, 850, 860; TRP 608; the apparatus 1102/1102; the processing system 1214, which may include the memory 376 and which may be the entire base station or a component of the base station, such as the TX processor 316, the RX processor 370, and/or the controller/processor 375). One or more of the illustrated operations may be omitted, transposed, or contemporaneous. In FIG. 10, optional aspects are illustrated with a dashed line. The method may enable a base station to indicate a panel to a UE for use in transmitting uplink transmissions.

At 1002, the base station may determine a panel for an uplink transmission. For example 1002 may be performed by determination component 1106 of apparatus 1102.

At 1004, the base station may send, to a UE, an indication (e.g., 408) of the panel for the uplink transmission. For example 1004 may be sent by UE panel component 1108 of apparatus 1102.

In some aspects, for example at 1006, the base station may send a beam pairing indication (e.g., 414) of a beam pairing. For example 1006 may be sent by beam pairing component 1110 of apparatus 1102. The base station may send the beam pairing indication of the beam pairing to the UE.

In some aspects, for example, at 1008, the base station may indicate the Tx beam associated with the panel of the UE, based on the indication (e.g., 408) of the panel and the indication (e.g., 414) of the beam pairing. For example 1008 may be sent by Tx beam component 1112 of apparatus 1102. In some aspects, the indication of the beam pairing may indicate a Rx beam of the base station and the panel of the UE for the uplink transmission. In some aspects, at least one of the Tx beam of the UE or the Rx beam of the base station may be indicated in a resource ID associated with at least one of an SRI for an SRS, an SSBI, a CSIRI, a base station beam indication, or a UE beam indication.

At 1010, the base station may receive, from the UE, the uplink transmission (e.g., 412) from a Tx beam associated with the panel. For example 1010 may be performed by reception component 1104 of apparatus 1102. In some aspects, the panel for the uplink transmission may be indicated by a panel identifier (ID). The panel ID refers to the panel of the UE utilized for the uplink transmission. In some aspects, the panel for the uplink transmission may be indicated based on a reference signal (RS) resource set. The RS resource set may be associated with the panel of the UE. The RS resource set may comprise at least one of a downlink (DL) RS or an uplink (UL) RS. The resources in the DL RS or the UL RS may be associated with a panel of the UE. In some aspects, the panel for the uplink transmission may be indicated based on a panel previously scheduled for uplink transmission. In some aspects, the uplink transmission may comprise at least one of PUCCH, a PUSCH, or a SRS.

In some aspects, for example, at 1012, the base station may receive, from the UE, a capability report (e.g., 418) including a time for switching between different panels. For example 1012 may be performed by capability component 1114 of apparatus 1102. In some aspects, the base station may indicate different Tx beams from a same panel for the uplink transmission in the plurality of aggregated slots or mini-slots when the time is greater than a threshold. In some aspects, the base station may indicate different Tx beams from different panels for the uplink transmission in the plurality of aggregated slots or mini-slots when the time is less than the threshold.

In some aspects, for example, at 1014, the base station may schedule the uplink transmission to be transmitted in a plurality of aggregated slots or mini-slots using different beams. For example 1014 may be performed by aggregation component 1116 of apparatus 1102. The base station may determine beams for the plurality of aggregated slots based on a UE capability.

In some aspects, the base station at 1016, may indicate different Tx beams from the panel for the uplink transmission. For example 1016 may be performed by panel Tx beams component 1118 of apparatus 1102. In some aspects, the base station may indicate different Tx beams from a same panel for the uplink transmission in the plurality of aggregated slots or mini-slots when the time is greater than a threshold. In some aspects, the base station may indicate different Tx beams from different panels for the uplink transmission in the plurality of aggregated slots or mini-slots when the time is less than a threshold.

In some aspects, the base station at 1018, may determine (e.g., 424) a gap configuration (e.g., 428) between the plurality of aggregated slots or mini-slots based on the capability report (e.g., 418). For example 1018 may be performed by gap component 1124 of apparatus 1102.

In some aspects, the base station at 1020, may indicate the gap configuration (e.g., 428) to the UE. For example 1020 may be performed by transmission component 1126 of apparatus 1102.

In some aspects the base station may be associated with a plurality of TRPs (e.g., 606, 608). In such aspects, the base station at 1022, may schedule (e.g., 610) multiple beam pairings for the plurality of TRPs. For example 1022 may be performed by schedule component 1120 of apparatus 1102.

In such aspects, the base station at 1024, may send, to the UE, a multiple beam indication (e.g., 612) of the multiple beam pairings. For example 1024 may be sent by multiple beam pairings component 1122 of apparatus 1102. The UE may be configured to transmit to the plurality of TRPs. In some aspects, the indication of the multiple beam pairings may indicate that different panels of the UE may be associated with different TRPs from among the plurality of TRPs. In some aspects, the indication of the multiple beam pairings may indicate that Tx beams from one panel of the UE may be paired with one TRP from among the plurality of TRPs.

Figure 11:
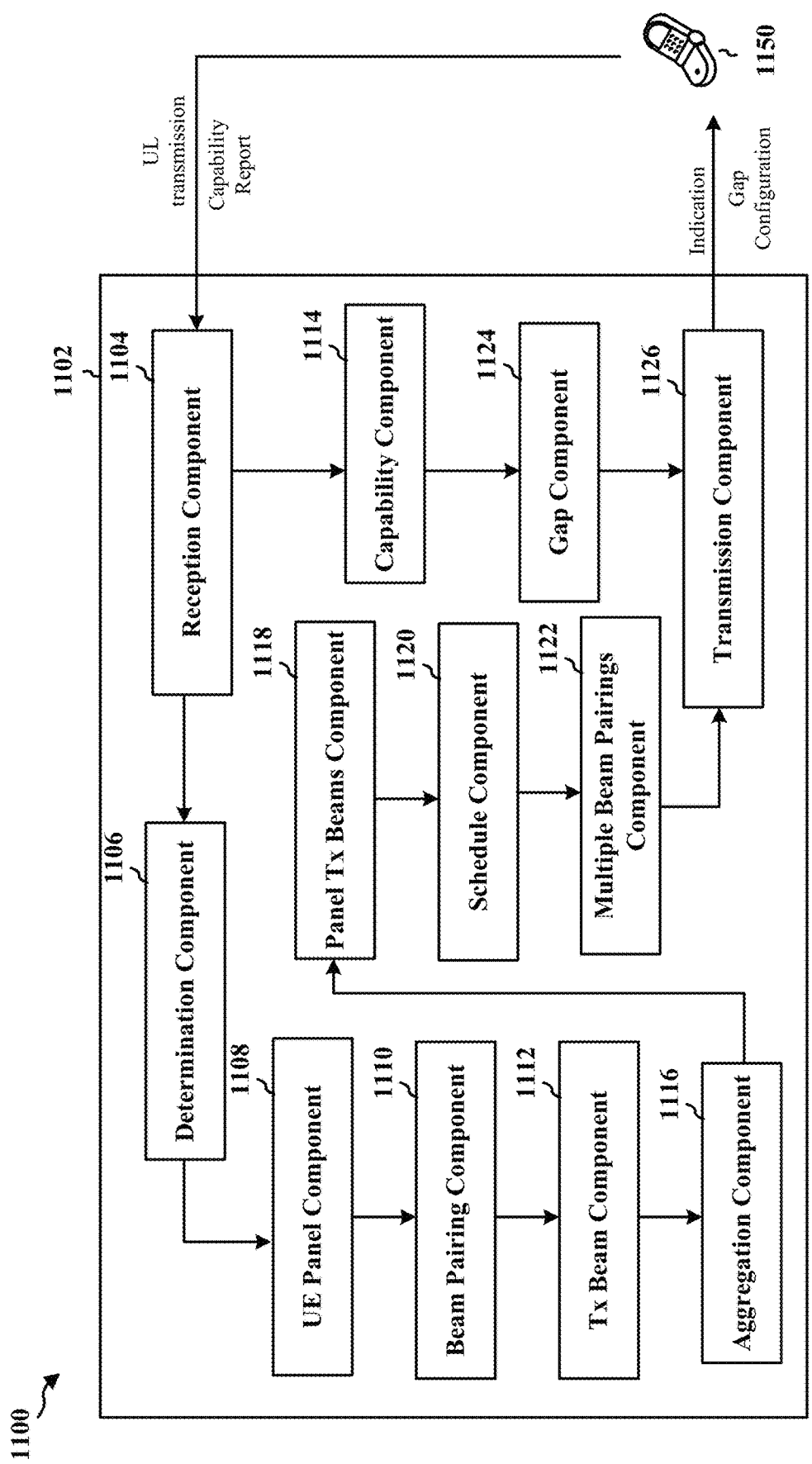
FIG. 11 is a conceptual data flow diagram illustrating the data flow between different means/components in an example apparatus.

FIG. 11 is a conceptual data flow diagram 1100 illustrating the data flow between different means/components in an example apparatus 1102. The apparatus may be a base station. The apparatus includes a reception component 1104 that may receive uplink communications from a UE (e.g., 1150). The apparatus includes a determination component 1106 that may determine a panel at the UE for an uplink transmission, e.g., as described in connection with 1002 of FIG. 10. The apparatus includes a UE panel component 1108 that sends to the UE an indication (e.g., 408) of the panel for the uplink transmission, e.g., as described in connection with 1004 of FIG. 10. The apparatus includes a beam pairing component 1110 that sends an indication (e.g., 414) of a beam pairing, e.g., as described in connection with 1006 of FIG. 10. The apparatus includes a Tx beam component 1112 that indicates the Tx beam associated with the panel of the UE, based on the indication (e.g., 408) of the panel and the indication (e.g., 414) of the beam pairing, e.g., as described in connection with 1008 of FIG. 11.

The apparatus includes a capability component 1114 that may receive, from the UE, a capability report (e.g., 418) including a time for switching between different panels, e.g., as described in connection with 1012 of FIG. 10. The apparatus includes an aggregation component 1116 that may schedule the uplink transmission to be transmitted in a plurality of aggregated slots or mini-slots (e.g., 502, 504, 506) using different beams, e.g., as described in connection with 1014 of FIG. 10. The base station may determine the beams for aggregated slots based on a UE capability (e.g., 418). The apparatus includes a panel Tx beams component 1118 that may indicate different Tx beams from the panel for the uplink transmission, e.g., as described in connection with 1016 of FIG. 10. In some aspects, the panel Tx beams component may indicate different Tx beams from a same panel for the uplink transmission in the plurality of aggregated slots or mini-slots when the time is greater than a threshold. In some aspects, the panel Tx beams component may indicate different Tx beams from different panels for the uplink transmission in the plurality of aggregated slots or mini-slots when the time is less than a threshold. The apparatus includes a gap component 1124 that may determine a gap configuration between the plurality of aggregated slots or mini-slots (e.g., 502, 504, 506) based on the capability report (e.g., 418), e.g., as described in connection with 1018 of FIG. 10. The apparatus includes a transmission component 1126 that may transmit downlink communications to a UE (e.g., 1150). In some aspects, the transmission component 1126 may indicate the gap configuration (e.g., 428) to the UE, e.g., as described in connection with 1020 of FIG. 10.

In some aspects, the apparatus may be associated with a plurality of TRPs (e.g., 606, 608). In such aspects, the apparatus includes a schedule component 1120 that may schedule (e.g., 610) multiple beam pairings for the plurality of TRPs, e.g., as described in connection with 1022 of FIG. 10. In such aspects, the apparatus includes a multiple beam pairings component 1122 that may send, to the UE, an indication (e.g., 612) of the multiple beam pairings, e.g., as described in connection with 1024 of FIG. 10. The UE may be configured to transmit to the plurality of TRPs.

The apparatus may include additional components that perform each of the blocks of the algorithm in the aforementioned flowcharts of FIG. 10. As such, each block in the aforementioned flowcharts of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
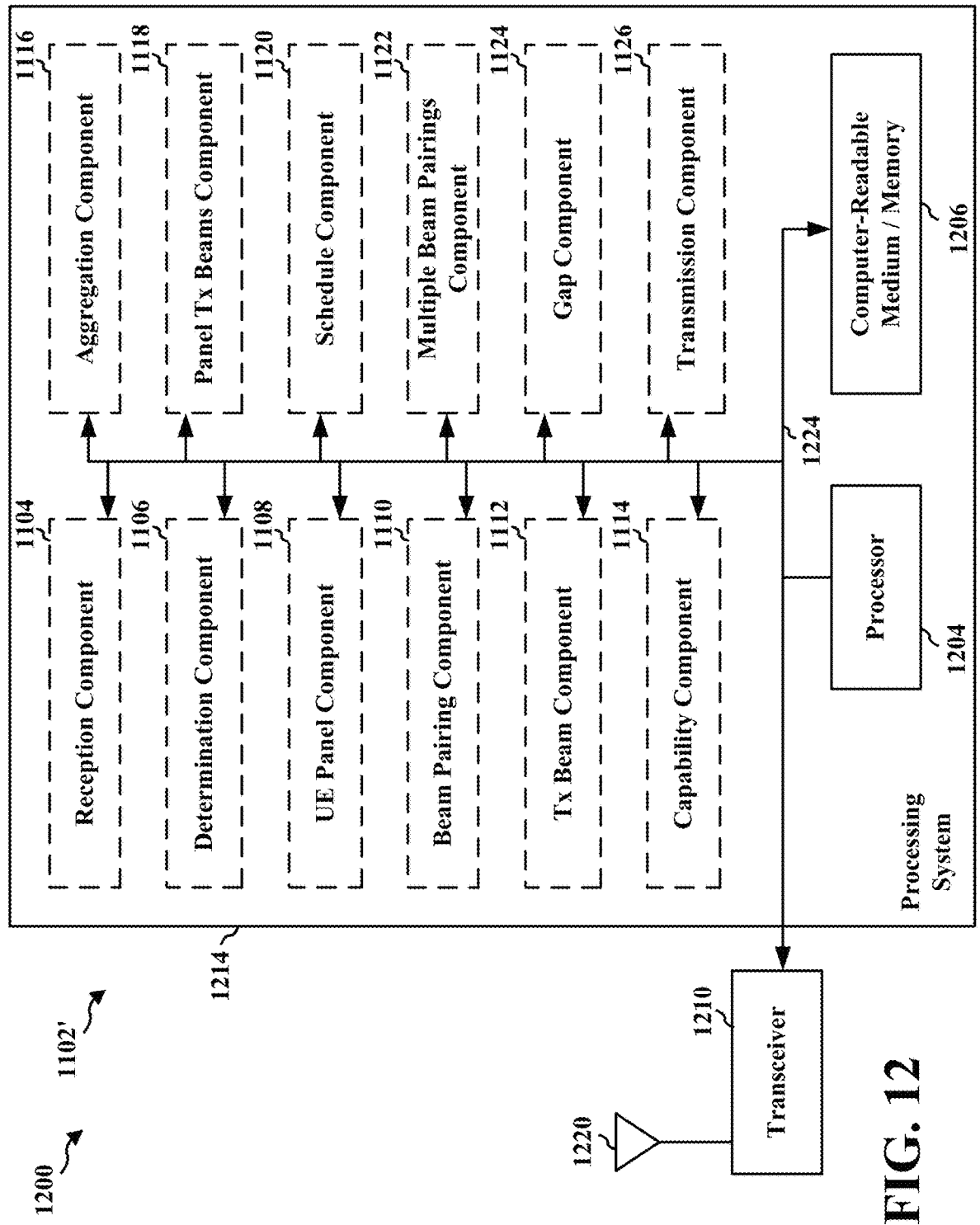
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, 1114, 1116, 1118, 1120, 1122, 1124, 1126 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1126, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112, 1114, 1116, 1118, 1120, 1122, 1124, 1126. The components may be software components running in the processor 1204, resident/stored in the computer readable medium/memory 1206, one or more hardware components coupled to the processor 1204, or some combination thereof. The processing system 1214 may be a component of the base station 310 and may include the memory 376 and/or at least one of the TX processor 316, the RX processor 370, and the controller/processor 375. Alternatively, the processing system 1214 may be the entire base station (e.g., see 310 of FIG. 3).

In one configuration, the apparatus 1102/1102' for wireless communication includes means for determining a panel, for an uplink transmission. The apparatus includes means for sending, to a UE, an indication of the panel for the uplink transmission. The apparatus includes means for receiving, from the UE, the uplink transmission from a Tx beam associated with the panel. The apparatus may further include means for sending an indication of a beam pairing. The apparatus may further include means for indicating the Tx beam associated with the panel of the UE, based on the indication of the panel and the indication of the beam pairing. The apparatus may further include means for receiving, from the UE, a capability report including a time for switching between different panels. The apparatus may further include means for scheduling the uplink transmission to be transmitted in a plurality of aggregated slots or mini-slots using different beams. The apparatus may determine beams for the aggregated slots based on a UE capability reported in the capability report. The apparatus may indicate different Tx beams for the uplink transmission. The apparatus may indicate different Tx beams from a same panel for the uplink transmission in the plurality of aggregated slots or mini-slots when the time is greater than a threshold. The apparatus may indicate different Tx beams from different panels for the uplink transmission in the plurality of aggregated slots or mini-slots when the time is less than a threshold. The apparatus may further include means for determining a gap configuration between the plurality of aggregated slots or mini-slots based on the capability report. The apparatus may further include means for indicating the gap configuration to the UE. The apparatus may further include means for scheduling multiple beam pairings for the plurality of TRPs. The apparatus may further include means for sending, to the UE, an indication of the multiple beam pairings. The UE may be configured to transmit to the plurality of TRPs. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following examples illustrate example embodiments. The embodiments and aspects of these embodiments may be used in combination with any previous embodiments or aspects of the previous embodiments disclosed or discussed in relation to the systems, methods, or devices of the figures.

Example 1 is a method of wireless communication at a User Equipment (UE) that includes receiving, from a base station, an indication of a UE panel for an uplink transmission, determining a transmit (Tx) panel at the UE based on the indication of the UE panel, and transmitting, to the base station, the uplink transmission using a Tx beam associated with the Tx panel.

In Example 2, the method of example 1 further includes receiving an indication of a beam pairing, and determining the Tx beam based on the indication of the UE panel and the indication of the beam pairing.

In Example 3, the method of example 2 may include that the beam pairing indicates a receive (Rx) beam of the base station, wherein the UE determines a corresponding Tx beam of the UE panel based on the Rx beam.

In Example 4, the method of example 3 may include that at least one of the Tx beam of the UE or the Rx beam of the base station is indicated in a resource ID associated with at least one of an sounding reference signal resource indicator (SRI) for a sounding reference signal (SRS), an synchronizing signal block indicator (SSBI), a channel state information reference signal resource indicator (CSIRI), or an indication of a base station beam, or an indication of a UE beam.

In Example 5, the methods of any of examples 1-4 may include that the UE panel is indicated by a panel identifier (ID), wherein the panel ID refers to the UE panel the UE is required to utilize for the uplink transmission.

In Example 6, the methods of any of examples 1-5 may include that the UE panel is indicated based on a reference signal (RS) resource set, wherein the RS resource set is associated with the UE panel.

In Example 7, the method of example 6 may include that the RS resource set is at least one of a downlink (DL) RS or an uplink (UL) RS, wherein the resources in the DL RS or the UL RS are associated with a panel.

In Example 8, the methods of any of examples 1-7 may include that the UE panel is indicated based on a panel previously scheduled for uplink transmission.

In Example 9, the methods of any of examples 1-8 may include that the uplink transmission is transmitting in a plurality of aggregated slots or mini-slots, and utilizing a different Tx beam to transmit the uplink transmission in each of the plurality of aggregated slots or mini-slots.

In Example 10, the method of example 9 may include that the different Tx beams used to transmit the uplink transmission in the plurality of aggregated slots or mini-slots are from a same panel when a switching time is greater than a threshold.

In Example 11, the methods of any of examples 9-10 may include that the different Tx beams used to transmit the uplink transmission in the plurality of aggregated slots or mini-slots are from different panels when a switching time is less than a threshold.

In Example 12, the methods of any of examples 9-11 may include sending, to the base station, a capability report including a time for switching between different panels or beams from the same panel.

In Example 13, the method of example 12 may include that a gap slot is reserved between each of the plurality of consecutive slots, wherein the gap slot is reserved based on the reported time for switching between different panels or beams from the same panel or a predefined rule.

In Example 14, the method of example 13 may include receiving a gap configuration from the base station.

In Example 15, the methods of any of examples 1-14 may include that the uplink transmission comprises at least one of physical uplink control channel (PUCCH), physical uplink shared channel (PUSCH), or a sounding reference signal (SRS)

In Example 16, the methods of any of examples 1-15 may include receiving, from the base station, an indication of multiple beam pairings, wherein the UE is configured to transmit to a plurality of transmit/receive points (TRPs) associated with the base station, determining the Tx beam and a corresponding TRP of the plurality of TRPs based on the indication, and transmitting, to the corresponding TRP, the uplink transmission using the Tx beam associated with the corresponding panel of the UE.

In Example 17, the method of example 16 may include that the indication of multiple beam pairings indicates that different panels of the UE are associated with different TRPs from among the plurality of TRPs.

In Example 18, the methods of any of examples 16-17 may include that the indication of multiple beam pairings indicates that Tx beams from one panel of the UE are paired with one TRP from among the plurality of TRPs.

Example 19 is a system or apparatus including means for implementing a method or realizing an apparatus as in any of examples 1-18.

Example 20 is a device including one or more processors and memory in electronic communication with the one or more processors storing instructions executable by the one or more processors to cause the system or apparatus to implement a method as in any of examples 1-18.

Example 21 is a non-transitory computer readable medium storing instructions executable by one or more processors to cause the one or more processors to implement a method as in any of examples 1-18.

Example 22 is a method of wireless communication at a base station that includes determining a panel, for an uplink transmission, sending, to a User Equipment (UE), an indication of the panel for the uplink transmission, and receiving, from the UE, the uplink transmission from a transmit (Tx) beam associated with the panel.

In Example 23, the method of example 22 further includes sending an indication of a beam pairing, and indicating the Tx beam associated with the panel of the UE, based on the indication of the panel and the indication of the beam pairing.

In Example 24, the method of example 23 may include that the indication of the beam pairing indicates a receive (Rx) beam of the base station and the panel of the UE for the uplink transmission.

In Example 25, the method of example 24 may include that at least one of the Tx beam of the UE or the Rx beam of the base station is indicated in a resource ID associated with at least one of an sounding reference signal resource indicator (SRI) for a sounding reference signal (SRS), an synchronizing signal block indicator (SSBI), a channel state information reference signal resource indicator (CSIRI), or an indication of a base station beam, or an indication of a UE beam.

In Example 26, the methods of any of examples of 22-25 may include that the panel for the uplink transmission is indicated by a panel identifier (ID), wherein the panel ID refers to the panel of the UE utilized for the uplink transmission.

In Example 27, the methods of any of examples 22-26 may include that wherein the panel for the uplink transmission is indicated based on a reference signal (RS) resource set, wherein the RS resource set is associated with the panel of the UE.

In Example 28, the method of example 27 may include that the RS resource set is at least one of a downlink (DL) RS or an uplink (UL) RS, wherein the resources in the DL RS or the UL RS are associated with a panel of the UE.

In Example 29, the methods of any of examples 22-28 may include that the panel for the uplink transmission is indicated based on a panel previously scheduled for uplink transmission.

In Example 30, the methods of any of examples 22-29 may include scheduling the uplink transmission to be transmitted in a plurality of aggregated slots or mini-slots using different beams, wherein the base station determines beams for the aggregated slots based on a UE capability.

In Example 31, the method of example 30 may include receiving, from the UE, a capability report including a time for switching between different panels, wherein the base station indicates different Tx beams from a same panel for the uplink transmission in the plurality of aggregated slots or mini-slots when the time is greater than a threshold, and wherein the base station indicates different Tx beams from different panels for the uplink transmission in the plurality of aggregated slots or mini-slots when the time is less than a threshold.

In Example 32, the method of example 31 may include determining a gap configuration between the plurality of aggregated slots or mini-slots based on the capability report, and indicating the gap configuration to the UE.

In Example 33, the methods of any of examples 22-32 may include that the uplink transmission comprises at least one of physical uplink control channel (PUCCH), physical uplink shared channel (PUSCH), or a sounding reference signal (SRS).

In Example 34, the methods of any of examples 22-33 may include that the base station is associated with a plurality of transmit/receive points (TRPs), scheduling multiple beam pairings for the plurality of TRPs, and sending, to the UE, an indication of the multiple beam pairings, wherein the UE is configured to transmit to the plurality of TRPs.

In Example 35, the method of example 34 may include that the indication of the multiple beam pairings indicates that different panels of the UE are associated with different TRPs from among the plurality of TRPs.

In Example 36, the methods of any of examples 34-35 may include that the indication of the multiple beam pairings indicates that Tx beams from one panel of the UE are paired with one TRP from among the plurality of TRPs.

Example 37 is a system or apparatus including means for implementing a method or realizing an apparatus as in any of examples 22-35.

Example 38 is a device including one or more processors and memory in electronic communication with the one or more processors storing instructions executable by the one or more processors to cause the system or apparatus to implement a method as in any of examples 22-35.

Example 39 is a non-transitory computer readable medium storing instructions executable by one or more processors to cause the one or more processors to implement a method as in any of examples 22-35.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE), comprising:
   receiving by the UE, from a base station, an indication of a UE panel for an uplink transmission;
   determining by the UE a transmit (Tx) panel at the UE based on the indication of the UE panel; and
   transmitting, to the base station, the uplink transmission using a Tx beam associated with the Tx panel, wherein a different Tx beam is used to transmit the uplink transmission in a plurality of aggregated slots or mini-slots from a same panel or different panels.

2. The method of claim 1, further comprising:
   receiving a beam pairing indication of a beam pairing; and
   determining the Tx beam based on the indication of the UE panel and the beam pairing indication.

3. The method of claim 2, wherein the beam pairing indicates a receive (Rx) beam of the base station, wherein the UE determines a corresponding Tx beam of the UE panel based on the Rx beam.

4. The method of claim 3, wherein at least one of the Tx beam of the UE or the Rx beam of the base station is indicated in a resource ID associated with at least one of an sounding reference signal resource indicator (SRI) for a sounding reference signal (SRS), an synchronizing signal block indicator (SSBI), a channel state information reference signal resource indicator (CSIRI), or a base station beam indication, or a UE beam indication.

5. The method of claim 1, wherein the UE panel is indicated by a panel identifier (ID), wherein the panel ID refers to the UE panel the UE is required to utilize for the uplink transmission.

6. The method of claim 1, wherein the UE panel is indicated based on a reference signal (RS) resource set, wherein the RS resource set is associated with the UE panel.

7. The method of claim 6, wherein the RS resource set is at least one of a downlink (DL) RS or an uplink (UL) RS, wherein the resources in the DL RS or the UL RS are associated with a panel.

8. The method of claim 1, wherein the UE panel is indicated based on a previously scheduled panel for a prior uplink transmission.

9. The method of claim 1, further comprising:
   utilizing the different Tx beam to transmit the uplink transmission in each of the plurality of aggregated slots or mini-slots.

10. The method of claim 9, wherein the different Tx beams used to transmit the uplink transmission in the plurality of aggregated slots or mini-slots are from the same panel when a switching time is greater than a threshold or are from the different panels when the switching time is less than the threshold.

11. The method of claim 9, further comprising:
    sending, to the base station, a capability report including a time for switching between different panels or beams from a same panel.

12. The method of claim 11, wherein a gap slot is reserved between each of a plurality of consecutive slots, wherein the gap slot is reserved based on the reported time for switching between the different panels or the beams from the same panel or a predefined rule.

13. The method of claim 12, further comprising:
    receiving a gap configuration from the base station.

14. The method of claim 1, further comprising:
    receiving, from the base station, a multiple beam indication of multiple beam pairings, wherein the UE is configured to transmit to a plurality of transmit/receive points (TRPs) associated with the base station;

determining the Tx beam and a corresponding TRP of the plurality of TRPs based on the indication; and transmitting, to the corresponding TRP, the uplink transmission using the Tx beam associated with a corresponding panel of the UE.

15. The method of claim 14, wherein the multiple beam indication of the multiple beam pairings indicates that different panels of the UE are associated with different TRPs from among the plurality of TRPs or that Tx beams from one panel of the UE are paired with one TRP from among the plurality of TRPs.

16. An apparatus for wireless communication at a user equipment (UE), comprising:
a memory; and
at least one processor coupled to the memory and configured to:
receive by the UE, from a base station, an indication of a UE panel for an uplink transmission;
determine by the UE a transmit (Tx) panel at the UE based on the indication of the UE panel; and
transmit, to the base station, the uplink transmission using a Tx beam associated with the Tx panel, wherein a different Tx beam is used to transmit the uplink transmission in a plurality of aggregated slots or mini-slots from a same panel or different panels.

17. A method of wireless communication at a base station, comprising:
determining a panel, for an uplink transmission;
sending, to a User Equipment (UE), an indication of the panel for the uplink transmission, wherein the uplink transmission is scheduled for transmission in a plurality of aggregated slots or mini-slots using different beams, wherein the indication indicates different transmit (Tx) beams from a same panel or a different panel for the uplink transmission; and
receiving, from the UE, the uplink transmission from a Tx beam associated with the panel.

18. The method of claim 17, further comprising:
sending a beam pairing indication of a beam pairing to the UE; and
indicating the Tx beam associated with the panel of the UE, based on the indication of the panel and the indication of the beam pairing.

19. The method of claim 18, wherein the indication of the beam pairing indicates a receive (Rx) beam of the base station and the panel of the UE for the uplink transmission.

20. The method of claim 19, wherein at least one of the Tx beam of the UE or the Rx beam of the base station is indicated in a resource ID associated with at least one of an sounding reference signal resource indicator (SRI) for a sounding reference signal (SRS), an synchronizing signal block indicator (SSBI), a channel state information reference signal resource indicator (CSIRI), or a base station beam indication, or a UE beam indication.

21. The method of claim 17, wherein the panel for the uplink transmission is indicated by a panel identifier (ID), wherein the panel ID refers to the panel of the UE utilized for the uplink transmission.

22. The method of claim 17, wherein the panel for the uplink transmission is indicated based on a reference signal (RS) resource set, wherein the RS resource set is associated with the panel of the UE.

23. The method of claim 22, wherein the RS resource set is at least one of a downlink (DL) RS or an uplink (UL) RS, wherein the resources in the DL RS or the UL RS are associated with the panel of the UE.

24. The method of claim 17, wherein the panel for the uplink transmission is indicated based on a previously scheduled panel for a prior uplink transmission.

25. The method of claim 17, further comprising:
scheduling the uplink transmission to be transmitted in the plurality of aggregated slots or mini-slots using different beams, wherein the base station determines beams for the plurality of aggregated slots based on a UE capability.

26. The method of claim 25, further comprising:
receiving, from the UE, a capability report including a time for switching between different panels,
wherein the base station indicates the different Tx beams from the same panel for the uplink transmission in the plurality of aggregated slots or mini-slots when the time is greater than a threshold, and
wherein the base station indicates the different Tx beams from the different panels for the uplink transmission in the plurality of aggregated slots or mini-slots when the time is less than the threshold.

27. The method of claim 26, further comprising:
determining a gap configuration between the plurality of aggregated slots or mini-slots based on the capability report; and
indicating the gap configuration to the UE.

28. The method of claim 17, wherein the base station is associated with a plurality of transmit/receive points (TRPs), the method further comprising:
scheduling multiple beam pairings for the plurality of TRPs; and
sending, to the UE, a multiple beam indication of the multiple beam pairings, wherein the UE is configured to transmit to the plurality of TRPs.

29. The method of claim 28, wherein the indication of the multiple beam pairings indicates that different panels of the UE are associated with different TRPs from among the plurality of TRPs or that Tx beams from one panel of the UE are paired with one TRP from among the plurality of TRPs.

30. An apparatus for wireless communication at a base station, comprising:
a memory; and
at least one processor coupled to the memory and configured to:
determine a panel, for an uplink transmission;
send, to a User Equipment (UE), an indication of the panel for the uplink transmission, wherein the uplink transmission is scheduled for transmission in a plurality of aggregated slots or mini-slots using different beams, wherein the indication indicates different transmit (Tx) beams from a same panel or a different panel for the uplink transmission; and
receive, from the UE, the uplink transmission from a transmit (Tx) beam associated with the panel.

* * * * *